Figure 1:
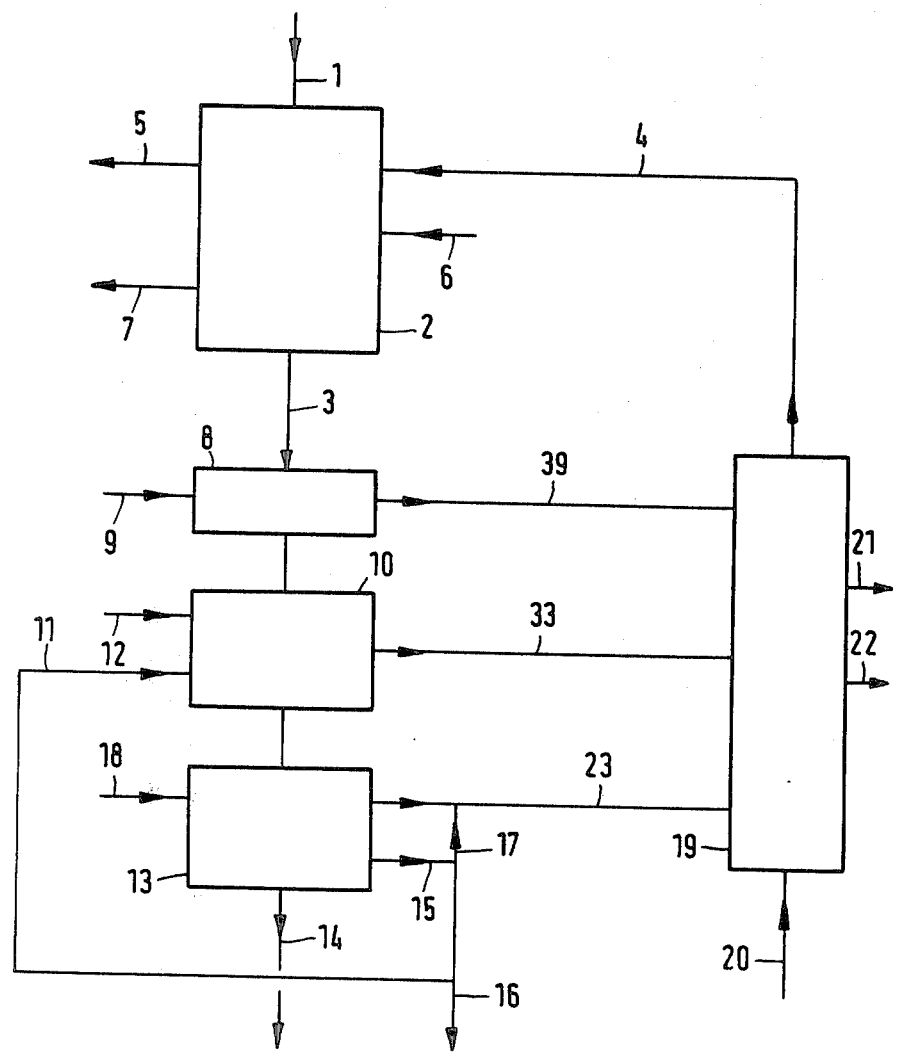

United States Patent [19]

Riediker

[11] 4,224,120
[45] Sep. 23, 1980

[54] ELECTROLYTIC METHOD AND APPARATUS FOR PRODUCING MAGNESIUM FROM A SALT SOLUTION CONTAINING MAGNESIUM SULPHATE

[75] Inventor: Werner Riediker, Toronto, Canada

[73] Assignee: Sulzer Brothers Limited, Winterthur, Switzerland

[21] Appl. No.: 60,370

[22] Filed: Jul. 25, 1979

[30] Foreign Application Priority Data

Aug. 4, 1978 [CH] Switzerland ........................ 8339/78

[51] Int. Cl.² .............................................. C25C 3/04
[52] U.S. Cl. .................................................... 204/70
[58] Field of Search ......................................... 204/70

[56] References Cited

U.S. PATENT DOCUMENTS 2,144,339  1/1939  Loist ...................................... 204/70

FOREIGN PATENT DOCUMENTS 570174  4/1945  United Kingdom ..................... 204/70

Primary Examiner—Howard S. Williams
Attorney, Agent, or Firm—Kenyon & Kenyon

[57] ABSTRACT

An electrolytic method of producing magnesium from magnesium chloride or carnallite produced, using calcium chloride. The calcium chloride is obtained from washing the hydrogen chloride and chlorine-containing waste gases obtained during the eletrolytic production of magnesium in milk of lime. The waste gases from the electrolysis unit are initially washed in a first absorption stage of the absorption process and then the obtained solids (magnesium hydroxide) are separated out for introduction into the third absorption stage to avoid blocking of the catalyst used in other stages of the absorption process.

4 Claims, 2 Drawing Figures

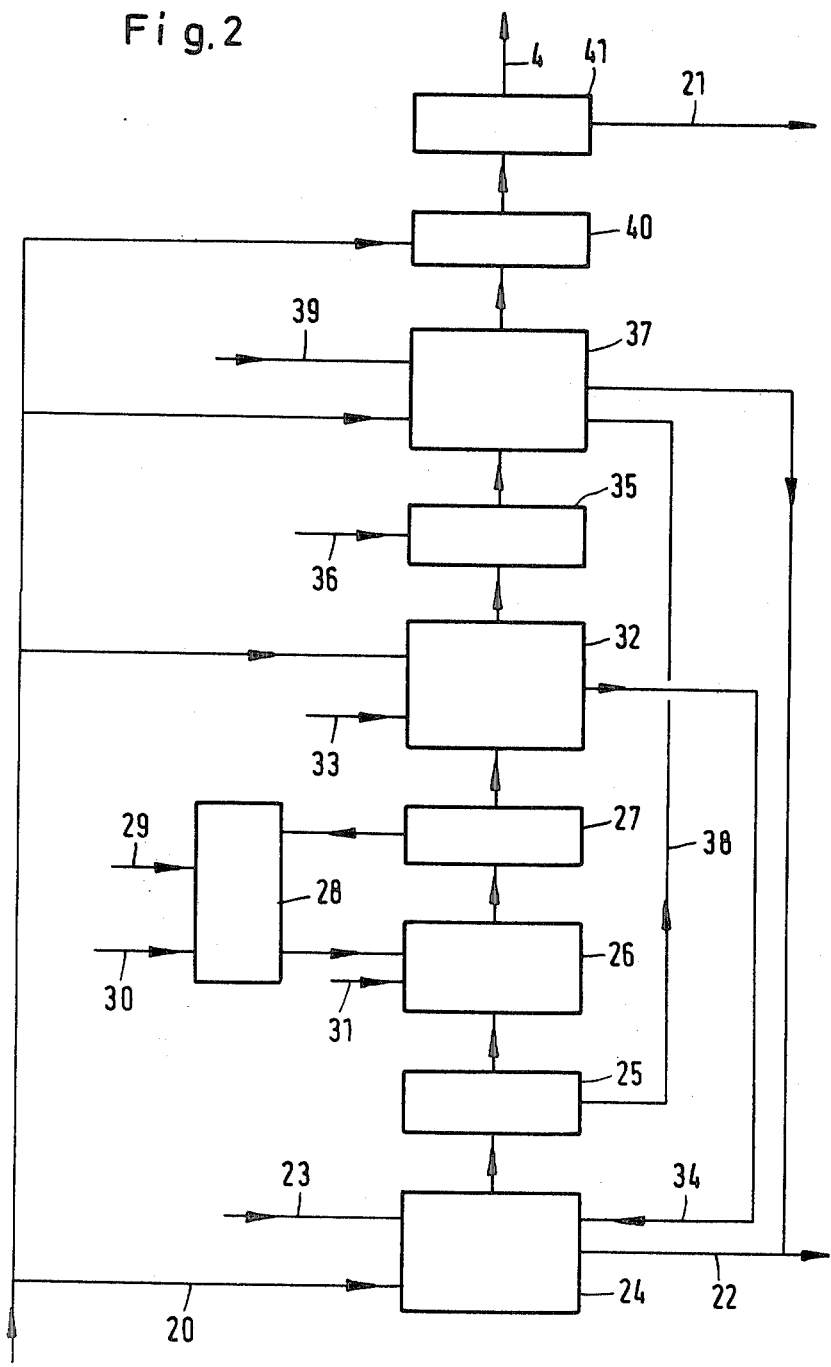

ELECTROLYTIC METHOD AND APPARATUS FOR PRODUCING MAGNESIUM FROM A SALT SOLUTION CONTAINING MAGNESIUM SULPHATE

The invention relates to a method and apparatus for producing magnesium from a salt solution containing magnesium sulphate.

Heretofore, it has been known to process salt solutions containing magnesium sulphate to obtain magnesium. Generally, these processes use a crystallization unit in which a calcium chloride solution is initially mixed with the salt solution to desulphate the salt solution by removing calcium sulphate. The resulting magnesium chloride or carnallite is then dried, melted and electrolyzed to obtain magnesium. During this latter phase, chlorine gas and gaseous hydrogen chloride are liberated. These gases are then supplied together with a catalyst to an absorption unit wherein milk of lime is used as an absorption agent to obtain a calcium chloride solution. This calcium chloride solution has, however, usually been thrown away, e.g., by discharging the solution into drains. At the same time, fresh calcium chloride which is required for desulphation is purchased from an external source.

Accordingly, it is an object of the invention to utilize the calcium chloride solution obtained in an absorption unit in the desulphation stage of a crystallization unit used in the production of magnesium from a salt solution.

It is another object of the invention to obtain a calcium chloride solution as a final product at a purity and concentration suitable for use in a desulphation stage of a crystallization process.

It is another object of the invention to use a minimum amount of catalyst in an absorption process used in a process for obtaining magnesium from a salt solution.

It is another object of the invention to reduce the consumption of milk of lime in an absorption process used in a process for obtaining magnesium from a salt solution.

It is another object of the invention to provide an economic process of obtaining magnesium from a salt solution.

Briefly, the invention provides a method and apparatus for producing magnesium from a salt solution containing magnesium sulphate.

The process includes an initial step of adding a calcium chloride solution to the salt solution in a crystallization unit to separate out calcium sulphate and to obtain magnesium chloride or carnallite. Thereafter, the obtained magnesium chloride or carnallite is dried and melted while liberating separate waste gas mixtures containing chlorine gas, air, gaseous hydrogen chloride and carbon dioxide. The melted magnesium chloride or carnallite is then subject to electrolysis to separate out magnesium while liberating a further gas mixture of chlorine gas, air and carbon dioxide.

The obtained gas mixtures are then processed in an absorption unit to obtain a calcium chloride solution. In accordance with the invention, the gas mixture of air, chlorine and carbon dioxide obtained during electrolysis is continuously washed with milk of lime at a pH above 10 in a first absorption stage to obtain a suspension containing hypochlorite ions. The resulting suspension is freed from solids in a first separating stage and the hypochlorite ions therein are decomposed to chloride ions in the presence of a catalyst containing nickel, iron, cobalt or copper, in a subsequent catalytic reaction stage at a pH above 10. The catalyst is next separated in a second separating stage and purified in a processing stage for recycling to the reaction stage. The solution obtained in the second separating stage is mixed with milk of lime in a second absorption stage and used at a pH below 3 for initially washing the waste gas containing chlorine, hydrogen chloride, carbon dioxide and air and coming from the melting step. The gas is subsequently supplied to the first absorption stage at a pH above 10, adding milk of lime.

Next, the chlorate compounds in the solution passing from the second absorption stage are reduced to chloride ions in the presence of a reducing agent and the solution is passed into a third absorption stage. The solids separated in the first separating stage are then mixed into the solution in the third absorption stage at a pH below 3. This solution then absorbs the hydrogen chloride from the waste gas mixture from the drying step. The solution from the third absorption stage is then neutralized by adding milk of lime and solids are separated in a third separating stage to obtain 30 to 40% calcium chloride solution containing not more than 50 ppm iron ions and not more than 50 ppm chlorate ions. The obtained calcium chloride solution is then supplied to the crystallization unit. Thus, in a number of purifying stages, a calcium chloride solution having the desired concentration and purity is economically obtained and can be used in the desulphation stage of the crystallization process.

The invention is based on the surprising discovery that, if the first separating stage is introduced, the magnesium hydroxide in the stream of gas coming from the electrolysis plant is separated before reaching the catalytic reaction stage and conveyed together with the other solids into the third absorption stage. This avoids blocking of the catalyst, so that the consumption of the catalyst can be kept very low and the catalyst can be treated and returned to the absorption process.

In addition, the consumption of milk of lime (the absorption agent) is kept within economic limits, since the milk of lime separated in the individual steps of the process is not thrown away but used in the subsequent steps.

These and other objects and advantages of the invention will become more apparent from the following detailed description and appended claims taken in conjunction with the accompanying drawings in which:

FIG. 1 illustrates a flow diagram of an apparatus for producing magnesium from a salt solution in accordance with the invention; and FIG. 2 illustrates a flow diagram of the components of the absorption unit of the plant of FIG. 1 in accordance with the invention.

Referring to FIG. 1, the apparatus includes a crystallization unit 2 to which a salt solution containing magnesium sulphate, e.g., carnallite, is supplied via a suitable line 1. The salt solution may, for example, be the waste liquor obtained during mining or during the production of calcium sulphate and calcium chloride from kainite, silvinite, and carnallite. The final product obtained from the salt solution, by crystallizing out and desulphation, is crystallized carnallite ($KCl.MgCl_2.6H_2O$), which is conveyed from unit 2 through line 3 for further processing.

The further processing of carnallite to obtain magnesium is known; see e.g., "Metallurgie des Magnesiums und anderer Leichtmetalle," a book by M. A. Eidenzon, a second, revised and enlarged edition of which was published in Russian by "Metallurgia," Moscow 1974.

The crystallization unit 2 is constructed in known manner and includes at least one desulphation stage (not shown) for receiving a flow of calcium chloride solution. Should the salt solution being treated not contain any or an insufficient amount of potassium for the production of carnallite, potassium chloride (KCl) can be introduced via a suitable line 6 to the crystallization unit 2.

During desulphation, $CaSO_4.2H_2O$ is precipitated from the salt solution and is removed from the crystallization unit 2 via a pipe 5. That is, during desulphation, the salt solution which contains magnesium sulphate is mixed in a mixer (not shown) with a calcium chloride solution and, thus, gypsum is obtained. In a subsequent decanter (not shown), the gypsum is separated from the solution and is removed from the unit 2 via the pipe 5. If the salt solution fed from line 1 contains other salts, for instance NaCl, this salt is removed by partial crystallization from the crystallization unit 2 via the pipe 7.

As desulphation processes are well known, it is not believed to be necessary to further describe such process.

A dryer 8, e.g., a fluidized-bed furnace to which flue gases are supplied via a line 9, is connected to the line 3 downstream of the crystallization unit 2 to receive and dry the crystallized carnallite while liberating a waste gas mixture containing carnallite fines, gaseous hydrogen chloride, air and carbon dioxide. During this process a large proportion of the water of crystallization from the carnallite is evaporated.

A melting furnace 10 is located downstream of the dryer 8 to receive and melt the dried carnallite to produce anhydrous carnallite in the melt by treatment with chlorine in the presence of carbon. The chlorine is supplied to the furnace 10 via a line 11 and the carbon is supplied through a line 12. At the same time, a waste gas mixture is liberated containing chlorine gas, gaseous hydrogen chloride, air and carbon dioxide. In particular, the following processes occur in the furnace:—melting and partial dehydration of carnallite, chlorination of the remaining water and the magnesium oxide, and purification of the anhydrous molten carnallite from solid admixtures.

An electrolysis unit 13 is located downstream of the furnace 10 and serves to split the carnallite into magnesium and chlorine. Liquid magnesium is removed from the unit 13 through a line 14 and sent for further processing while chlorine gas is removed from the unit through a line 15. Part of the chlorine gas is conveyed through the line 11 to the melting furnace 10, another part is conveyed through a line 16 for further treatment outside the apparatus, and another part is conveyed through a line 17 and added to the gaseous mixture of chlorine, carbon dioxide and air from the electrolysis unit 13, for use in the manufacture of calcium chloride. The air which constantly enters the electrolysis unit 13 is diagrammatically indicated in the drawing by a line 18.

The chlorine gas and hydrogen chloride liberated during the conversion of carnallite to magnesium and chlorine during the individual process steps (dryer 8, furnace 10 and electrolysis unit 13), is absorbed by washing with milk of lime—i.e., $Ca(OH)_2$—in an absorption unit 19, which will be described in detail with reference to FIG. 2, the product being a calcium chloride solution which can be returned to the crystallization process taking place in the crystallization unit 2. The place where milk of lime is introduced into the unit 19 is indicated by reference 20 whereas the places from which purified air and solids are discharged from the unit 19 is indicated by references 21 and 22.

Referring to FIG. 2, the absorption unit 19 includes a first absorption stage 24 which is connected to a line 23 to the electrolysis unit 13 to receive the gaseous mixture of air, chlorine and carbon dioxide. The mixture is washed with milk of lime which is supplied through the line 20 at a pH above 10. Water vapor and waste air purified from chlorine are discharged from the absorption stage 24 to the atmosphere through the line 22.

Since the gas from the electrolysis unit 13 is relatively hot (e.g., approximately 100°-150° C.), the heat of the mixture may advantageously be used for evaporating the water in the absorption stage 24.

Absorption stage 24 yields a suspension mainly consisting of calcium chloride solution, calcium hypochlorite solution, magnesium hydroxide, milk of lime and solid calcium carbonate.

Small amounts of solid magnesium compounds will inevitably be entrained by the gas mixture from the electrolysis unit 13 and will initially form magnesium hydroxide in the absorption stage 24. The magnesium hydroxide, however, seriously interferes with catalytic decomposition, since magnesium hydroxide surrounds or absorbs the catalyst like a sponge and blocks the catalyst in the case where the catalyst contains nickel, iron, cobalt or copper. For this reason, a first separating stage 25 such as a filter or centrifuge is connected downstream of the absorption stage 24 for separating the solids for subsequent introduction in a third absorption stage, to be described hereinafter.

A catalytic reaction stage 26 is connected downstream of the separating stage 25 for receiving the suspension to decompose the hypochlorite ions ($OCl^-$) to chloride ions ($Cl^-$) at a pH above 10 using a catalyst of the previously-mentioned kind.

Both absorption in the first stage 24 and the catalytic reaction are brought about at a pH above 10. The reason is that the pH greatly influences the information of calcium chlorate, i.e., the pH varies inversely with the number of chlorate ions produced.

A second separating stage 27 is connected downstream of the catalytic reaction stage 26 in order to separate out the catalyst from the solution by filtration and a processing stage 28 is connected to the separating stage 27 to receive and purify the separated catalyst by adding an acid, e.g., hydrochloric acid, via a line 29. In addition, a line 30 is connected to the processing stage 28 to deliver fresh catalyst to make up for losses of catalyst. The catalyst can be recycled to the catalytic reaction stage 26 via a suitable line. A separate line 31 is also connected to the catalytic reaction stage 26 to supply an alkali, such as a caustic soda solution, in order to maintain the required pH.

The catalyst can be one of the afore-mentioned elements or a mixture of a number of elements. The solution from the separating stage 27 consists mainly of calcium chloride and contains only a little calcium hypochlorite, a large amount of hydroxyl ions ($OH^-$) and a few hypochlorite ions ($OCl^-$).

A second absorption stage 32 is connected to the separating stage 27 to receive the initial calcium chloride solution. The absorption stage 32 is also connected to the line 20 to receive milk of lime for mixing with the solution at a pH below 3 and to the line 33 from the melting furnace 10 to receive the gas mixture from the furnace 10. The absorption stage 32 serves to wash the gas mixture with the solution. If the pH is below 3 hydrogen chloride is absorbed but not chlorine gas.

The gaseous mixture of chlorine, carbon dioxide and air is returned through a line 34 to the absorption stage 24. An additional absorption stage (not shown) could be provided in which chlorine and carbon dioxide are absorbed by adding milk if lime at a pH above 10 and purified air containing water vapor could be discharged from the additional absorption stage to atmosphere.

The solution leaving the absorption stage 32 consists mainly of calcium chloride and contains only a little hydrogen chloride, a few chlorate ions ($ClO_3^-$) and a few hypochlorite ions ($OCl^-$).

A reducing stage 35 is connected downstream of the second absorption stage 32 and receives a reducing agent, such as sulphite ions ($SO_3^-$), via a line 36 at a pH below 3 in order to reduce the chlorate compounds in solution to chloride ions ($Cl^-$). This step is important because the chlorate ions interfere with the carnallite process.

A third absorption stage 37 is connected downstream of the reducing stage 35 to receive the solids (i.e., milk of lime and calcium carbonate), separated in the first separating stage 25 via a line 38 at a pH below 3 and the solution from the reducing stage 35. In addition, the absorption stage 37 is connected to the line 39 from the dryer 8 to receive the gas mixture from the dryer 8. The absorption stage 37 functions so that the hydrogen chloride is absorbed from the gas mixture containing hydrogen chloride, carbon dioxide and air supplied from the carnallite dryer 8. The purified air is discharged to atmosphere together with the water vapor and carbon dioxide.

If the solid milk of lime and calcium carbonate are insufficient for absorption in the absorption stage 37, additional milk of lime is supplied through the line 20.

Finally, a neutralizing stage 40 is connected downstream of the third absorption stage to receive and neutralize the solution (mainly calcium chloride) leaving the absorption stage 37 to a pH of 6 to 7 by adding milk of lime. Also, a separation stage 41 is located downstream of the neutralizing stage 40 to separate and discharge the solids and obtain a purified 30–40% calcium chloride solution containing not more than 50 ppm iron ions and not more than 50 ppm chloride ions. This calcium chloride solution is returned through a line 4 to the desulphation stage of the crystallization unit 2 (FIG. 1).

It is to be noted that the heat in the streams of gas supplied from the furnace 10 or dryer 8 to the other absorption stages of the unit 18 may be used to evaporate the water in the respective absorption stages.

What is claimed is:

1. A method of producing magnesium from a salt solution containing magnesium sulphate, said method comprising the steps of
    adding a calcium chloride solution to the salt solution in a crystallization process containing at least one desulphation stage to separate out calcium sulphate and to obtain at least one of the salts magnesium chloride and carnallite;
    thereafter drying and melting the obtained magnesium chloride or carnallite while liberating separate waste gas mixtures containing air, gaseous hydrogen chloride, and carbon dioxide;
    thereafter electrolytically separating out magnesium from the obtained magnesium chloride or carnallite while liberating a third gas mixture of chloride gas, air, and carbon dioxide;
    continuously washing the third gas mixture with milk of lime at a pH above 10 in a first absorption stage to obtain a first suspension containing hypochloride ions;
    thereafter separating solids from the first suspension in a first separating stage;
    decomposing the hyprochlorite ions in the solid-free first suspension to chloride ions in the presence of a catalyst containing at least one of nickel, iron, cobalt and copper within a catalytic reaction stage at a pH above 10;
    thereafter separating out the catalyst in a second separating stage and purifying the catalyst in a processing stage for recycling to the reaction stage;
    mixing the solution obtained in the second absorption stage with milk of lime and washing the gas mixture obtained from melting the magnesium chloride or carnallite with the obtained mixture at a pH below 3 in a second absorption stage;
    thereafter reducing chlorate compounds in the solution to chloride ions in the presence of a reducing agent;
    then mixing the solution from the second absorption stage and the solids separated in the first separating stage at a pH below 3 in a third absorption stage to then absorb hydrogen chloride from the waste gas mixture obtained from drying the magnesium chloride or carnallite;
    neutralizing the solution obtained in the third absorption stage with milk of lime;
    thereafter separating solids from the neutralized solution in a third separating stage to obtain a 30% to 40% calcium chloride solution containing not more than 50 ppm iron ions and not more than 50 ppm chlorate ions; and
    finally supplying the calcium chloride solution to the crystallization unit.

2. A method as set forth in claim 1 which further comprises the step of adding milk of lime to the third absorption stage for mixing therein.

3. A method as set forth in claim 1 wherein gas is exhausted from the second absorption stage and supplied to the first absorption stage at a pH above 10.

4. An apparatus for producing magnesium from a salt solution containing magnesium sulphate, said apparatus comprising:
    a crystallization unit for receiving the salt solution and a calcium chloride solution;
    a dryer for receiving and drying at least one of crystallized magnesium chloride or carnallite from said crystallization unit while liberating a first waste gas mixture containing gaseous hydrogen chloride, air and calcium dioxide;
    a melting furnace for receiving and melting the dried crystallized magnesium chloride or carnallite while liberating a second waste gas mixture containing at least one of chlorine gas, gaseous hydrogen chloride, air and carbon dioxide;
    an electrolysis unit for separating magnesium from the melted magnesium chloride or carnallite while liberating a third gas mixture containing at least one of chlorine gas, air and carbon dioxide; and
    an absorption unit for receiving each of the gas mixtures for washing with milk of lime to obtain a calcium chloride solution for cycling to said crystallization unit, said absorption unit including a first absorption stage for washing said third gas mixture with milk of lime at a pH above 10 to obtain a first suspension, a first separating stage for separating solids from the first suspension, catalytic reaction stage for receiving the resultant solution to decompose hypochlorite ions therein to chloride ions in the presence of a catalyst at a pH above 10, a second separating stage for separating out the catalyst from said solution to obtain an initial calcium chloride solution, a processing stage for purifying the catalyst and recycling it to the said catalytic reaction stage a second absorption stage for first mixing said initial calcium chloride solution with milk of lime at a pH below 3 and then washing said second gas mixture with the resultant solution to obtain a second solution, a reducing stage for reducing chlorate compounds in the second solution to chloride ions in the presence of a reducing agent, a third absorption stage for receiving the solids separated in said first separating stage at a pH below 3 and the second solution to form a third solution and for washing said first gas mixture with said third solution, a neutralizing stage for neutralizing said third solution with milk of lime, and a third separating stage for separating solids from said third solution to obtain a 30% to 40% calcium chloride solution containing not more than 50 ppm iron ions and not more than 50 ppm chlorate ions, said third separating stage being connected to said crystallization unit to cycle said 30% to 40% calcium chloride solution thereto.

* * * * *

UNITED STATES PATENT AND TRADEMARK OFFICE
CERTIFICATE OF CORRECTION

PATENT NO. : 4,224,120

DATED : September 23, 1980

INVENTOR(S) : Werner Riediker

It is certified that error appears in the above—identified patent and that said Letters Patent is hereby corrected as shown below:

Column 2, line 27, change "," , first occurrence to -- . --.

Column 6, line 11, change "hyprochlorite" to --hypochlorite--

Signed and Sealed this

Sixth Day of January 1981

[SEAL]

*Attest:*

SIDNEY A. DIAMOND

*Attesting Officer*   *Commissioner of Patents and Trademarks*